Feb. 20, 1968 E. F. WARD 3,370,201
OVERLOAD PROTECTIVE CIRCUIT FOR ELECTRICAL MACHINERY
Filed March 29, 1965 2 Sheets-Sheet 1

INVENTOR.
ELMER F. WARD
BY White & Haefliger
ATTORNEYS.

Feb. 20, 1968     E. F. WARD     3,370,201
OVERLOAD PROTECTIVE CIRCUIT FOR ELECTRICAL MACHINERY
Filed March 29, 1965     2 Sheets-Sheet 2
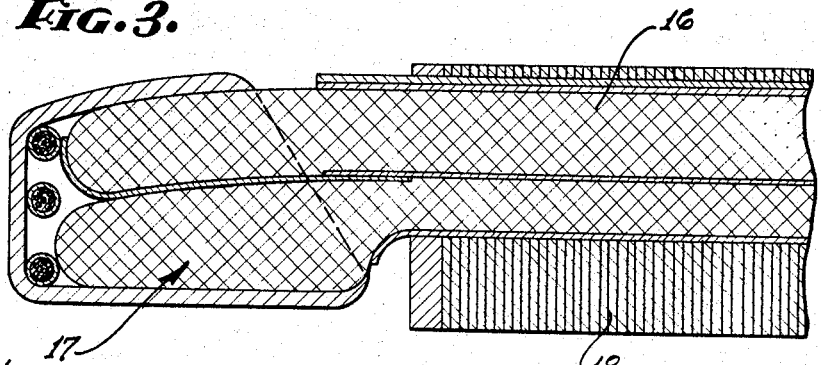
INVENTOR.
ELMER F. WARD
BY White & Haefliger
ATTORNEYS.

United States Patent Office 3,370,201
Patented Feb. 20, 1968

3,370,201
OVERLOAD PROTECTIVE CIRCUIT FOR ELECTRICAL MACHINERY
Elmer F. Ward, Santa Ana, Calif., assignor to Task Corporation, Anaheim, Calif., a corporation of California
Filed Mar. 29, 1965, Ser. No. 443,370
11 Claims. (Cl. 317—13)

ABSTRACT OF THE DISCLOSURE

The disclosed overload protection control embodies an auxiliary conductor such as an auxiliary winding inductively coupled to and electrically connected in parallel with the main winding of an electrical machine, and also connected in series with a heater resistance to pass only a portion of the machine current, and to supply increased current to the heater when the main winding passes increased current. A thermostatic element is located to respond to such increased heating of the resistance, for controlling electrical energization of the main winding.

---

This invention relates generally to overload protection control of electrical machinery, and more particularly concerns improvements in sensitivity and response time of such controls.

One prior control constructed to sense a current overload condition in an electrical motor has included a coil wound about the three external leads to the three phase stator. Normally the sum of the three phase currents at any instant of time is zero; but should current in one winding phase increase abnormally, the increased current generated in the coil is utilized to effect deenergization of the motor. One disadvantage with this equipment is the possibility that current will increase in all three motor windings during burnout, and so the coil will not detect an unbalance in the current phases and the motor will not be shut down.

Another prior control utilizes resistance type heaters in series with each of the three windings in the three phase stator, together with a thermostatic disc adjacent the heaters and functioning to effect motor shut down in response to an abnormal current increase in any winding and resistance. One disadvantage with this is the undesirably necessary size increase of the thermostatic disc as the motor size increases.

A still different prior overload control has a transformer coil wound about one external lead to one winding of a three phase stator and also about the return or center lead; however, this arrangement requires an external transformer the size of which increases with motor size.

It is a major object of the present invention to provide an unusually effective overload protection control that is not subject to the above disadvantages and which also incorporates a number of advantages. Basically, the invention comprises an auxiliary conductor such as an auxiliary winding in the electrical machine and connected in electrical parallel with the main winding and in series with a heater resistance to pass only a portion of the machine current and to supply increased current to the heater resistance when the main winding passes increased current. As a result, should the main winding begin to draw excess current as during excessive overload, the auxiliary winding immediately passes more current to the heater effecting operation of a thermostatic element to actuate a device such as a relay to shut down the machine. Further, the size of the control need not increase with machine size or capacity since only a portion of total current in any winding passes through it; no extra control transformer is needed externally of the machine; the auxiliary winding can actually be a part of the main winding thus maintaining resistive and inductive balance between phases of multiple phase machines; and the heater and thermostatic element can be kept small in size and located in close proximity to the machine body, for quickly absorbing heat from the body keeping the thermostatic element at near motor ambient temperature and thereby improving its response time during overload.

These and other objects and advantages of the invention, as well as the details of illustrative embodiments, will be more fully understood from the following detailed description of the drawings in which:

FIG. 3 is an enlarged fragmentary section taken through the FIG. 1 motor stator winding;

FIG. 4 is a diagrammatic showing of the motor stator winding incorporating the invention;

FIG. 5 is a diagrammatic showing of a modified stator winding incorporating the invention;

FIG. 6 is a detailed diagrammatic showing of one leg of the FIG. 5 winding; and

FIG. 7 is a view like FIG. 4 but showing multiple auxiliary windings and heaters.

Figure 1:
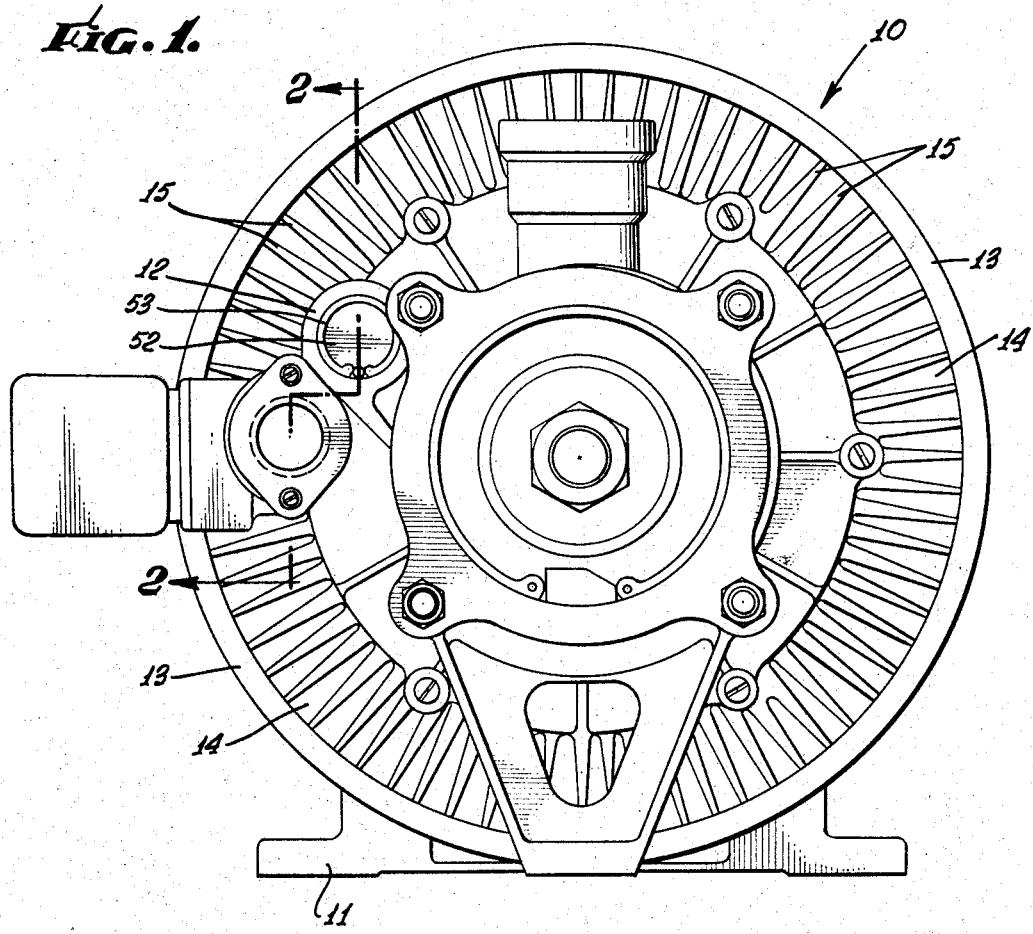
FIG. 1 is an end view of an electrical motor in which the invention may be incorporated.

Referring first to FIG. 1, a three-phase induction type motor is generally indicated at 10, with a base 11, body 12, shroud 13, cooling air channel 14 between the body and shroud, and cooling air guide vanes 15. FIG. 3 shows a typical stator winding 16 including end turns 17, and stator laminations 18.

Although the invention may be applied to single phase as well as polyphase electrical machines, FIG. 4 shows three-phase stator windings or legs 22 for an electrical motor incorporating the invention. These windings are connected in Y configuration with three external leads 23 and a common return lead 24. Windings 22 may be considered as the main stator windings.

In accordance with the invention, an auxiliary conductor, typically in the form of an auxiliary winding 25, is connected in electrical parallel with a main winding 22 and in series with a heater, as for example resistor 26, to pass only a small portion of the machine current and to supply increased current to the heater when the main winding 22 passes increased current during overload. Typically, there is an auxiliary winding 25 connected in parallel with a main winding 22, and there may be one for each main winding, as schematically illustrated in FIG. 7, so that should any main winding draw excess current the auxiliary winding associated therewith will also draw increased current which then flows through the heater resistance 26. Several heaters 60 for example may be respectively connected in series with each of the auxiliary windings 61, as indicated in FIG. 7, all heaters being in heat transfer proximity to thermostatic element 62.

A suitable thermostatic element, as for example a bimetallic strip 28, is located to respond to heat transfer from heater 26 above a predetermined threshold, for operating means to control electrical current energization of the main windings and auxiliary windings. One such means is shown to include a suitably energized relay 35 electrically connected at 31 to the thermostatic element, and having a member schematically indicated at 32 to operate the main switches 33 in series with the leads 23, and the main switch 34 in series with return lead 24. Under normal conditions, the heat developed by the heater 26 is not sufficient to trip the element 28; however, when a main winding 22 begins to draw excess current which could result in rapid burn-out of the motor, the relay is immediately operated by the heater and element 28 to open the main switches and shut-down the motor. At the same time, the physical size of the heater 26 and element 28 may be kept small in relation to motor size and even though the motor size is increased, since only a portion of the current in the stator is tapped to flow through the heater.

FIG. 5 shows three-phase stator windings 40 each of which includes two legs 41 connected in parallel. Further, each leg 41 may include multiple windings 41a connected in parallel as indicated in FIG. 6. In this embodiment the auxiliary winding 42 is connected in parallel with windings 41a, and the lead thereof is brought out to connect with a heater resistance 43 in heat transfer proximity to the bimetallic strip 44 of the thermostatic element. When the latter is heated sufficiently, it moves an actuator 45 to open a switch arm 46 breaking the circuit 47 that includes a relay (not shown) for operating the main switches for the motor leads. The heater 43, strip 44 and switch 46 may be designated as a thermoswitch 48 that is normally closed.

Figure 2:
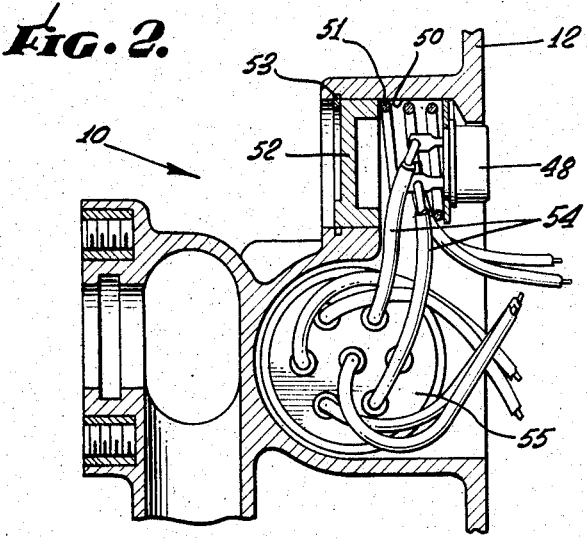
FIG. 2 is an enlarged section taken on line 2—2 of FIG. 1.

A further feature of the invention is the locating of the thermoswitch 48 of FIG. 6 or the element 28 of FIG. 4 in heat transfer proximity to the motor body 12, so that the element or switch may also respond to motor body heating. For example, the element or switch may thus be kept at the motor body ambient temperature, so as to respond more quickly to heating by the heater element. FIG. 2 shows one way to accomplish this, the body 12 forming a recess 50 at one end of the motor, with the thermoswitch 48 retained in the recess by spring 51, seal plug 52 and plug retainer 53. The thermoswitch heater leads 54 extend to the stator lead connector 55 for appropriate attachment with the stator leads. Accordingly, access to the small size thermoswitch is easily had.

I claim:

1. In combination, an electrical machine having a main winding for passing current, a thermostatic element, a heater to pass current and develop heat, said heater being located in heat transfer relation to said element, and an auxiliary conductor in the machine and having the form of a winding inductively coupled to and connected in electrical parallel with said main winding and in series with said heater to pass only a portion of the machine current and to supply increased current to the heater when said main winding passes increased current.

2. In combination, an electrical machine having a main stator winding for passing current, a thermostatic element, a resistor to pass current and develop heat, said resistor being located in heat transfer relation to said element, an auxiliary conductor in the machine and having the form of a winding inductively coupled to and connected in electrical parallel with said main winding and in electrical series with said resistor to pass only a portion of the machine current and to supply increased current to the resistor when the main winding passes increased current, and means operable by said element to control electrical current energization of the main winding and auxiliary conductor.

3. The combination of claim 2 in which said main winding comprises multiple winding legs connected in electrical parallel, and said auxiliary conductor also comprises a winding adjacent one of said legs.

4. The combination of claim 2 in which said machine includes a body, and said element is carried in heat transfer proximity to said body.

5. The combination of claim 2 in which said main winding is of three-phase construction, said auxiliary conductor being connected in electrical parallel with one phase leg of the main winding structure.

6. The combination of claim 2 in which the machine comprises a motor having a metallic body forming a recess at one end of the motor, said resistor and element being contained in said recess with the element in heat transfer proximity to said body.

7. The combination of claim 5 in which said one phase leg comprises multiple windings connected in parallel.

8. For combination with a thermostatic element and a heater to pass electrical current for operating said element, an electrical machine having a main winding for passing current, and an auxiliary conductor in the machine and having the form of a winding inductively coupled to and connected in electrical parallel with the main winding and connectible in series with the heater to pass only a portion of the machine current and to supply increased current to the heater when the main winding passes increased current.

9. The combination of claim 8 in which said main winding is of three-phase construction, said auxiliary conductor being connected in electrical parallel with one phase leg of the main winding structure.

10. The combination of claim 9 in which said one phase leg comprises multiple windings connected in parallel.

11. In combination, a polyphase electrical machine having multiple stator main windings one for each phase, thermostatic means, resistors to pass current and develop heat, the resistors located in heat transfer proximity to said thermostatic means, and auxiliary windings in the stator and respectively inductively coupled to and connected in electrical parallel with said main windings and in electrical series with said resistors, so that each auxiliary winding passes only a portion of the load current passed by its parallel associated main winding and is operable to supply increased current to its series associated resistor when the associated main winding passes increased current.

References Cited

UNITED STATES PATENTS

| | | | |
|---|---|---|---|
| 2,712,083 | 6/1955 | Armstrong | 317—13 X |
| 2,758,255 | 8/1956 | Lytle | 317—13 |
| 2,909,719 | 10/1959 | Dubberley | 318—473 |
| 3,023,350 | 2/1962 | Broadley et al. | 317—13 X |
| 3,155,878 | 11/1964 | Gibson et al. | 317—13 |

MILTON O. HIRSHFIELD, *Primary Examiner.*

J. D. TRAMMELL, *Assistant Examiner.*